No. 750,195. PATENTED JAN. 19, 1904.
E. J. JOHNSON.
AUTOMATIC VEHICLE BRAKE.
APPLICATION FILED JULY 29, 1903.
NO MODEL. 2 SHEETS—SHEET 1.
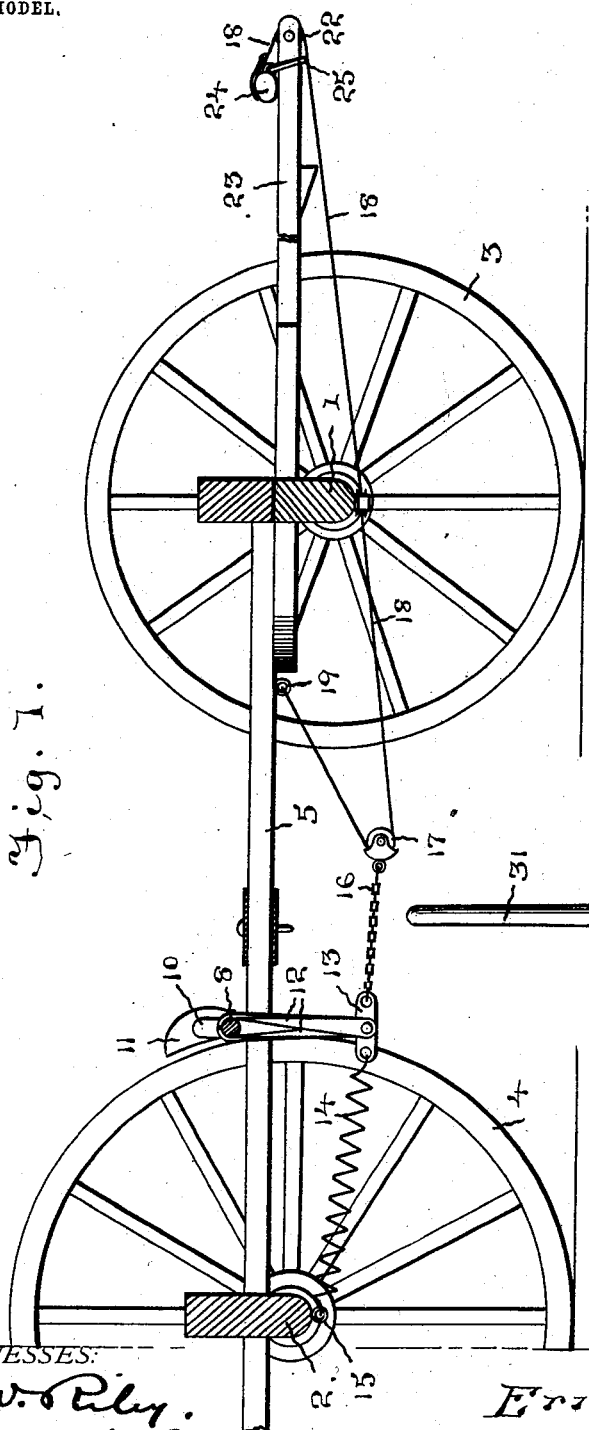
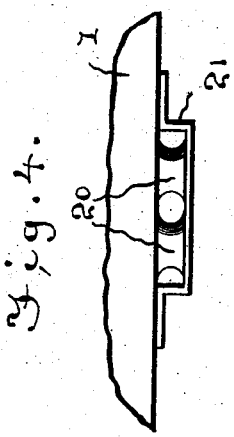
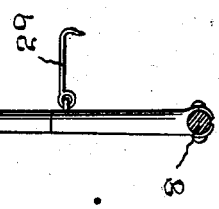
WITNESSES: INVENTOR
F. W. Riley. Erick J. Johnson.
Chas. S. Hoyer. BY Victor J. Evans
Attorney No. 750,195. PATENTED JAN. 19, 1904.
E. J. JOHNSON.
AUTOMATIC VEHICLE BRAKE.
APPLICATION FILED JULY 29, 1903.
NO MODEL. 2 SHEETS—SHEET 2.

WITNESSES:
F. W. Rey.
Chas. S. Hyer.

INVENTOR
Erick J. Johnson.
BY Victor J. Evans
Attorney

No. 750,195. Patented January 19, 1904.

UNITED STATES PATENT OFFICE.

ERICK J. JOHNSON, OF GILMANTON, WISCONSIN, ASSIGNOR OF ONE-THIRD TO JULIUS J. HOPPERSTAD, OF DECORAH, IOWA.

AUTOMATIC VEHICLE-BRAKE.

SPECIFICATION forming part of Letters Patent No. 750,195, dated January 19, 1904.

Application filed July 29, 1903. Serial No. 167,431. (No model.)

*To all whom it may concern:*

Be it known that I, ERICK J. JOHNSON, a citizen of the United States, residing at Gilmanton, in the county of Buffalo and State of Wisconsin, have invented new and useful Improvements in Automatic Vehicle-Brakes, of which the following is a specification.

This invention relates to automatic wagon-brakes, the object in view being to provide brake mechanism which operates automatically to apply the brakes to the wheels of a wagon when the animals hold back, as in going downhill, the brake mechanism being mounted wholly upon the truck or running-gear of the wagon, so as not to interfere with removing or replacing of the wagon box or body. The brake mechanism, hereinafter described, is also adapted to be operated by means of a hand-lever under the control of the driver while on the wagon.

With the above and other objects in view the invention consists in the novel construction, combination, and arrangement of parts, as will be hereinafter fully described, illustrated, and claimed.

Figure 2:
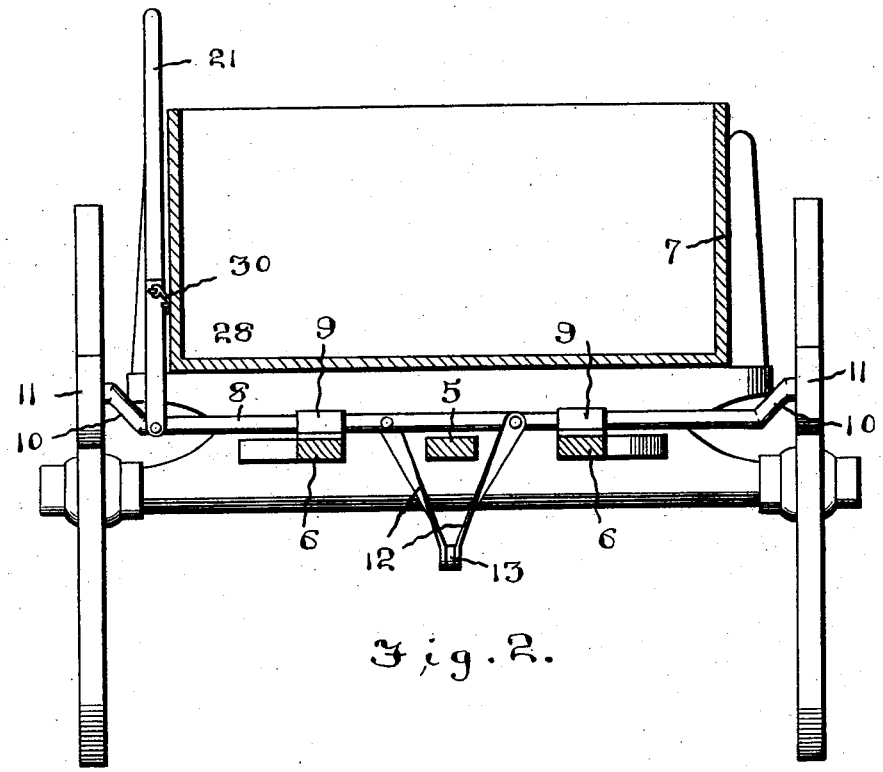
Figure 3:
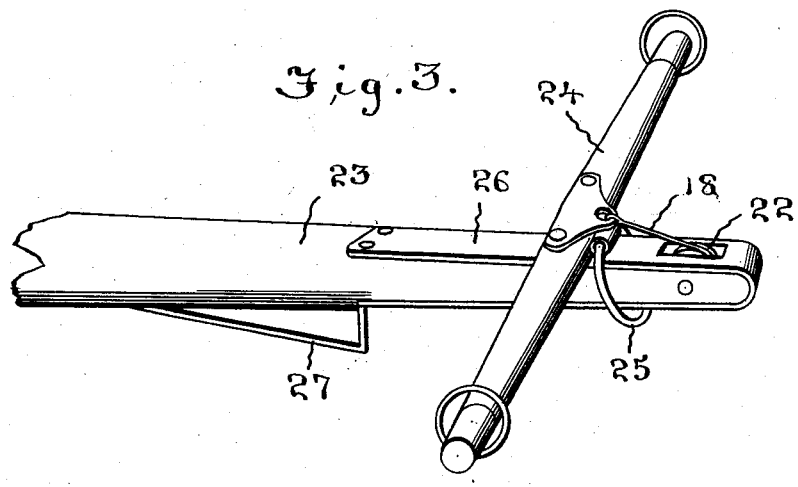

In the accompanying drawings, Figure 1 is a vertical longitudinal section through a wagon-truck, showing the improved brake mechanism applied thereto. Fig. 2 is a vertical cross-section through the same. Fig. 3 is an enlarged detail perspective view of the front end of the pole or tongue, showing the neck-yoke and brake connections. Fig. 4 is a detail front elevation of a portion of the front axle, showing the guide-pulleys. Fig. 5 is a detail section showing the hand-lever and lever-socket in elevation.

Like reference-numerals designate corresponding parts in all figures of the drawings.

Referring to the drawings, 1 and 2 designate the front and rear axles, respectively, of the truck or running-gear of an ordinary wagon equipped with the front and rear wheels 3 and 4, respectively. The axles or bolsters are connected by means of the usual reach 5 and braced by means of the hounds 6, while resting upon the bolsters is a suitable wagon-body 7.

In carrying out the present invention a rock-shaft 8 is journaled in suitable bearings 9 upon the hounds, said rock-shaft extending across the reach and having its ends bent to form cranks 10, to the extremities of which are applied brake shoes or blocks 11, adapted to be brought to bear against the tires of the rear wheels, as shown in Figs. 1 and 2.

Connected centrally with the rock-shaft 8 is a double lever 12, consisting of two metal straps which are attached at their extremities to the rock-shaft, on opposite sides of the latter, and which lie on the opposite sides of the reach-bar 5, the lower ends of the members of the lever converging and being connected to a cross-head 13, provided at its opposite ends with openings, one of which receives one end of a brake-releasing spring 14, the opposite end of which is connected at 15 to the axle or other stationary part of the running-gear of the wagon.

Extending forward from the opposite end of the cross-head 13 is a chain or other flexible connection 16, to the forward end of which is connected a block 17. Around the block 17 passes a flexible connection or cable 18, one extremity of which is attached at 19 to the reach-bar 5 and the other portion of which extends forward beneath the front axle 1, passing between a pair of guide-pulleys 20, mounted in a suitable bracket 21 and secured to the lower side of the axle, as shown in Fig. 4. The connection 18 extends forward of the guide-pulleys 20, where it passes around a guide-pulley 22, mounted in the extreme forward end of the draft pole or tongue 23. To the extremity of the connection 18 is attached a neck-yoke 24, and the neck-yoke is provided with a traveler-ring 25, which encircles the forward end of the pole or tongue 23 and is adapted to ride back and forth thereon. The extremity of the pole 23 is covered by means of a protecting plate or strip 26, upon which the traveler-ring works, and a limiting shoulder or stop 27 is also arranged beneath the pole or tongue 23, against which the ring 25 may take up.

One end of the rock-shaft 8 is connected to the lower extremity of a tubular socket-piece 28, said socket-piece extending upward and being provided at or near its upper end with a hook 29, which may be engaged with or disengaged from an eye or keeper 30 on the wagon-body, as shown in Fig. 2.

31 designates a hand-lever which is insertible in and detachable from the socket 28, the said lever extending upward from the side of the wagon-body in reach of the driver, who by vibrating said lever may apply and release the brakes independently of the team.

From the foregoing description and in view of the accompanying drawings it will be seen that in descending a hill when the animals pull back on the neck-yoke the connection 18 draws forward on the pulley 17 and chain 16, thus rocking the shaft 8 and applying the brakes. In reaching the level the neck-yoke is moved forward, and thereupon the spring 14 operates to release the brake-shoes. In order to back the team, the hook 29 may be connected with its eye on the wagon-body, which will allow the animals to back without applying the brake-shoes, the rock-shaft 8 being held against movement. In ascending a hill the driver may, by means of the hand-lever 31, apply the brakes whenever it is desired to stop and rest the draft-animals.

Having thus described the invention, what is claimed as new is—

1. An automatic wagon-brake mounted wholly upon the truck or running-gear and comprising a rock-shaft having cranked extremities, brake-shoes applied to said extremities, a lever for operating said rock-shaft, a cross-head at the extremity of said lever, a brake-releasing spring interposed between said cross-head and a fixed part of the running-gear, a pulley-block flexibly connected to the other arm of said cross-head, and a flexible connection attached at one end to the running-gear, passing around said pulley-block and attached to and adapted to be operated by the neck-yoke, substantially as described.

2. An automatic wagon-brake mounted wholly upon the truck or running-gear and comprising a rock-shaft with cranked extremities, brake-shoes mounted on said extremities, a lever connected with said rock-shaft and provided with a cross-head, a brake-releasing spring connected to one arm of said cross-head, brake connections interposed between the other arm of said cross-head and the neck-yoke, a lever-socket connected directly to said rock-shaft, a detachable hand-lever associated with said lever-socket, and a hook on the socket adapted to engage means on the wagon-body to hold said socket against movement, substantially as described.

In testimony whereof I affix my signature in presence of two witnesses.

ERICK J. JOHNSON.

Witnesses:
ANTON OLSON,
NILS. J. HOVEY.